US009906782B2

(12) United States Patent
Martin et al.

(10) Patent No.: US 9,906,782 B2
(45) Date of Patent: Feb. 27, 2018

(54) SOURCE AGNOSTIC AUDIO/VISUAL ANALYSIS FRAMEWORK

(71) Applicant: Cinder LLC, Beaverton, OR (US)

(72) Inventors: Steven Martin, Portland, OR (US); Ayal Lutwak, Portland, OR (US); Paul Niman, Beaverton, OR (US)

(73) Assignee: Cinder LLC, Beaverton, OR (US)

( * ) Notice: Subject to any disclaimer, the term of this patent is extended or adjusted under 35 U.S.C. 154(b) by 0 days.

(21) Appl. No.: 14/995,099

(22) Filed: Jan. 13, 2016

(65) Prior Publication Data
US 2016/0205397 A1 Jul. 14, 2016

Related U.S. Application Data

(60) Provisional application No. 62/103,542, filed on Jan. 14, 2015.

(51) Int. Cl.
H04H 60/33 (2008.01)
H04N 17/00 (2006.01)
H04N 17/04 (2006.01)

(52) U.S. Cl.
CPC .......... *H04N 17/004* (2013.01); *H04N 17/04* (2013.01)

(58) Field of Classification Search
CPC ............. H04N 21/23418; H04N 21/25; H04N 21/2401; H04N 21/2404
See application file for complete search history.

(56) References Cited

U.S. PATENT DOCUMENTS

| 2005/0068429 | A1* | 3/2005 | Kreiner | G08B 13/19606 348/231.6 |
| 2005/0116880 | A1* | 6/2005 | Flanigan | G11B 27/034 345/3.2 |
| 2005/0140809 | A1* | 6/2005 | Lim | H04N 5/23203 348/333.01 |
| 2005/0219362 | A1* | 10/2005 | Garoutte | H04N 17/004 348/180 |
| 2006/0160436 | A1* | 7/2006 | Oka | H04N 17/04 439/894 |
| 2008/0028426 | A1* | 1/2008 | Goto | G06F 17/30784 725/39 |
| 2008/0049123 | A1* | 2/2008 | Gloudemans | H04N 5/222 348/239 |
| 2008/0195664 | A1* | 8/2008 | Maharajh | G06F 17/30035 |
| 2008/0278627 | A1* | 11/2008 | Howcroft | H04N 17/004 348/554 |
| 2010/0180315 | A1* | 7/2010 | Nakamichi | H04N 17/004 725/116 |

(Continued)

Primary Examiner — Pankaj Kumar
Assistant Examiner — Timothy Newlin
(74) Attorney, Agent, or Firm — McCoy Russell LLP

(57) ABSTRACT

Systems and methods for determining the quality of video playback are provided. Errors in video playback may be detected at any point of transmission at which video can be extracted regardless of the means of transmission or the type of device through which transmission occurs thus allowing for testing of a plurality of devices or transmission means with the same testing system. Such devices or transmission means may provide direct or indirect input for analysis and identification of frame glitches, pulldown performance, frame jitter, frame judder, frame skip, frame tear, audio synchronization, quality comparison and MOS scoring.

17 Claims, 15 Drawing Sheets

(56) References Cited

U.S. PATENT DOCUMENTS

| | | | |
|---|---|---|---|
| 2010/0183035 A1* | 7/2010 | Li | H04J 3/0697 370/503 |
| 2011/0109752 A1* | 5/2011 | Lee | H04N 5/23248 348/208.1 |
| 2011/0214143 A1* | 9/2011 | Rits | G06F 17/30026 725/34 |
| 2012/0002059 A1* | 1/2012 | Levy | H04N 17/004 348/192 |
| 2012/0066735 A1* | 3/2012 | Pham | H04N 21/64723 725/116 |
| 2013/0057706 A1* | 3/2013 | Steinberg | H04N 17/004 348/188 |
| 2013/0148741 A1* | 6/2013 | Steinberg | H04N 19/59 375/240.25 |
| 2013/0155193 A1* | 6/2013 | Ikeda | H04N 13/02 348/46 |
| 2013/0273853 A1* | 10/2013 | Reed | H04W 24/00 455/67.11 |
| 2013/0314549 A1* | 11/2013 | Higuchi | H04N 17/04 348/175 |
| 2013/0342719 A1* | 12/2013 | Tashiro | H04N 7/0127 348/222.1 |
| 2013/0347019 A1* | 12/2013 | Herlein | H04N 21/2407 725/22 |
| 2015/0016538 A1* | 1/2015 | Yamashita | H04N 7/015 375/240.24 |
| 2016/0080804 A1* | 3/2016 | Firth | H04N 21/2407 725/14 |
| 2016/0080830 A1* | 3/2016 | Kim | H04N 21/8133 725/19 |
| 2016/0165226 A1* | 6/2016 | Djurdjevic | G06T 7/80 348/188 |

\* cited by examiner

THE A/V ANALYSIS SERVER 226 RECEIVES A FILE TRANSFER SIGNAL FROM THE HIGH SPEED VIDEO CAMERA 830 AND IN RESPONSE GENERATES A FILE INCLUDING VIDEO INFORMATION AND VALUES AS A CAPTURED FRAME FILE

1002

↓

THE FRAME ANALYZER 826 RECEIVES A DATA TRANSFER SIGNAL FROM THE CAPTURED FRAME FILES 822 AND IN RESPONSE ANALYZES THE PLAYBACK PERFORMANCE FOR TIMING OF FRAME DELIVERY, SKIPPED FRAMES, GLITCHES, FRAME JITTER, FRAME JUDDER, FRAME SKIPS AND FRAME TEARS.

1004

↓

THE PIXEL ANALYZER 824 RECEIVES A DATA TRANSFER SIGNAL FROM THE FRAME ANALYZER 826 AND IN RESPONSE PERFORMS A PIXEL-TO-PIXEL QUALITY COMPARISON TO THE ORIGINAL.

1006

↓

THE RESULT GENERATOR 828 RECEIVES A DATA TRANSFER SIGNAL FROM THE PIXEL ANALYZER 824 AND IN RESPONSE GENERATES A REPORT OF THE PLAYBACK PERFORMANCE BY SECOND AND A SUMMARY OF CORRECT DISPLAY RATES AT REFRESH INTERVALS.

SOURCE AGNOSTIC AUDIO/VISUAL ANALYSIS FRAMEWORK

CROSS-REFERENCE TO RELATED APPLICATIONS

This application claims benefit of U.S. Provisional Patent Application No. 62/103,542 filed Jan. 14, 2015, the entirety of which is incorporated herein by reference.

BACKGROUND

Video and audio delivery presents significant network transmission challenges with display failure possible at multiple points along a transmission pathway. For example, "on demand" streaming content is encoded for storage, transmitted electronically via the Internet, decoded on a device on a network, transmitted wirelessly to a display and then decoded by that display for playback. Errors can occur at one or more points within this transmission, making the exact source of the errors difficult to isolate. Most video display analysis systems can only be used with specific input sources, requiring different data collection systems for each type of input. For example, current testing methods typically require a hard medium such as a video card from which to collect data and objectively analyze image playback quality. However, client devices such as wireless displays do not have a hard medium that can be used to download playback information, requiring the use of subjective "golden-eye" (real-time human-based) testing in order to analyze image playback quality.

Generally, video quality is analyzed using (1) subjective determinations where human subjects score the quality of video playback, aka "golden-eye" testing, and (2) objective metrics such as Peak Signal to Noise Ratio (PSNR), Structural Similarity Index Metric (SSIM), multi-scale structural similarity (MS-SSIM) and the Sarnoff Picture Quality Rating (PQR). While human perception is the desired standard, subjective testing requires more time, resources, and preparation than objective measures, making it difficult to use during the development phase of a video playback display or system. Additionally, subjective determinations rely on the statistical averaging of experiences from several individuals, requiring uniform random sampling across people from different backgrounds, cultures, attitudes, expectations, genders, ages, physical abilities, interest levels and the like, and is frequently difficult to reproduce. Subjective analysis is also unable to detect the specific time point of an error or the cause of the error, merely rating the overall playback on a scale of 1 (bad) to 5 (excellent) which makes it difficult to address any issues seen. Objective measures, while less expensive and easily replicable, frequently do not have stable correlations with subjective human perception.

Analyzing video quality is one of the biggest challenges when evaluating codecs, transmission systems, and client devices. Currently, companies use a combination of objective and subjective tests to validate playback displays; however, both of these methods have drawbacks. Additionally, as technology advances and the medium or system for content delivery changes, a gap is created in video analysis tools requiring the return to purely subjective analysis.

BRIEF SUMMARY

A source agnostic audio/video analysis system may be used to evaluate a variety of wired or wireless client devices regardless of the sources of input or output of the device. In some embodiments, a source agnostic audio/video analysis system for testing image playback display may include a video content server, a client device capable of receiving video transmission, at least one display capture device, and at least one audio/video analysis server. In some embodiments, the video content server may be part of the client device. In other embodiments, it may be a separate unit.

The first display capture device is adapted to capture video frames from the video content server displayed on the client device. In some embodiments, the display capture device captures the video content displayed on the client device at a rate higher than a frame display rate on the client device. While any rate higher the frame display rate on the client device may be used, in some embodiments, the display capture devices captures the video content displayed on the client display device at a rate of at least two times higher than refresh rate of the display of the client device. For example, if a client device has a frame display rate of 23.98 progressive frames per second, the display capture device may capture the video content displayed on the client display device at a rate of about 47.96 frames per second, about 71.94 frames per second, about 95.92 frames per second, about 167.86 frames per second, about 239.8 frames per second, about 287.76 frames per second, about 338 frames per second, about 359.7 frames per second, about 479.6 frames per second, or any fraction or multiple thereof such that the rate is at least two times greater than the client display device rate.

Video displayed on the client device may be sent via wired or wireless mediums. In some embodiments, video displayed on the client device may be sent through an air medium to the lens of the first display capture device. In some embodiments, a second display capture device may capture the video frames from the video content server displayed on the client device at a higher resolution but a slower frame rate than the first display capture device.

Each frame of the displayed video content may be tagged prior to display, may be tagged real time during playback, and/or may include an audio tag with a combination of tones and gradients of tone.

In some embodiments, a means for analyzing audio/video playback may include oversampling an audio/video playback on a display using a first high speed camera to capture errors subject to aliasing at a rate of playback on the display, a means for analyzing frames captured by the first high speed camera according to end user experience metrics, and/or means for generating a report of playback errors mapped to a time point at which they occur based on the analysis of images captured by the first high speed camera.

In further embodiments, an audio/video analysis system may include an audio/visual pattern generator, at least one display capture device, a reference computer device, a video conferencing system, a client device, and at least one audio/video analysis server. A first display capture device may be adapted to capture an audio/visual signal from the audio/visual pattern generator, transmit the captured audio/visual signal to the reference computer device for display through the video conferencing system on the client device. In some embodiments, the reception of the audio/visual signal by the client device is analyzed by the audio/video analysis server for end user experience metrics.

In some embodiments, the captured video frames are analyzed by the audio/video analysis server to locate and identify errors subject to aliasing at the client device frame display rate and map the errors to a time point in a video playback at which they occur. In further embodiments, the means for analyzing frames may include comparing captured frames with reference frames.

These and other embodiments, features and potential advantages will become apparent with reference to the following description.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 10 is a flow chart of an embodiment of a process for audio/video analysis.

DETAILED DESCRIPTION

Glossary

Figure 1:
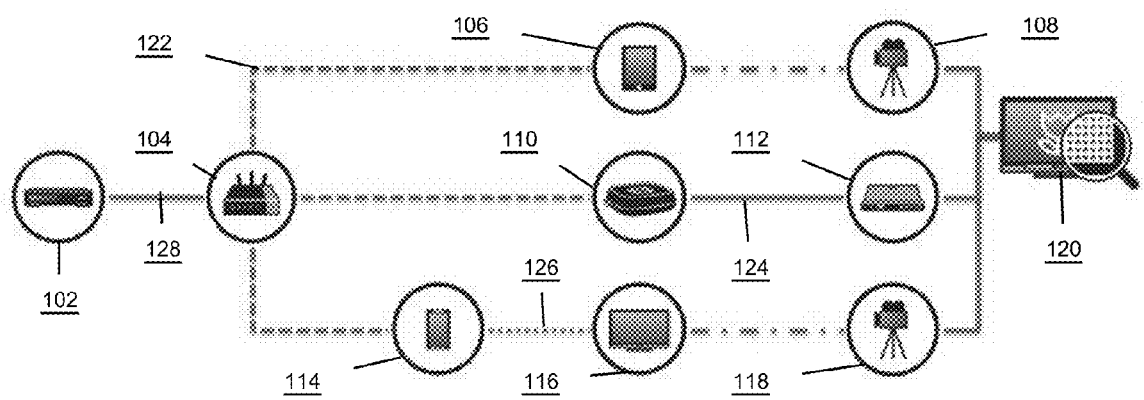
FIG. 1 is an embodiment of a system for agnostic transmission of data for audio/video analysis.

"Aliasing" in this context refers to an effect that causes different signals to become indistinguishable when sampled or distortion or artifacts that result when the signal reconstructed from samples is different from the original continuous signal. Aliasing may occur in signals sampled in time (temporal aliasing) and spatially sampled signals (spatial aliasing), "Clipping" in this context refers to a form of waveform distortion that occurs when an amplifier is overdriven and attempts to deliver an output voltage or current beyond its maximum capability.

"Dropout" in this context refers to a small loss of data in an audio or video file on tape or disk.

"EEE" in this context refers to Energy Efficient Ethernet, a standard designed to improve the efficiency of data center network equipment and provide standardized signaling mechanisms that can enable rapid transitions between normal operation and low-power idle (LPI) modes in systems on either end of the physical layer link.

"Ethernet" in this context refers to a family of computer networking technologies for local area networks (LANs).

"Fast Fourier Transform (FFT)" in this context refers to a method to calculate the discrete Fourier transform and its inverse. It breaks down a signal into sinusoids of different frequencies transforms from time domain to frequency domain.

"Frame jitter" in this context refers to deviation of a signal from the discrete displayed frame.

"Frame judder" in this context refers to jerky playback caused by converting between frame rates. Telecine judder, a type of frame judder, is caused by splitting each frame into fields and repeating some of them in a 3:2 pattern.

"Frame pulldown" in this context refers to an algorithm for matching the slower frame rate of film to the faster refresh rate of a 60 Hz television.

"Frame skip" in this context refers to a phenomenon in which one or more frames is omitted.

"Frame tear" in this context refers to when the input and output frame, field phases or field rates do not match each other causing the image displayed to come from two different frames.

"HDMI" in this context refers to High-Definition Multimedia Interface (HDMI)—a digital interface for transmitting audio and video data in a single cable.

"HDMI capture card" in this context refers to a circuit board that can be inserted in a computer to enable one-card acquisition of full analog/digital video and digital audio input.

"Information appliance device" in this context refers to an appliance that is designed to easily perform a specific electronic function.

"Interlaced video" in this context refers to a technique for doubling the perceived frame rate of a video display without consuming extra bandwidth. The interlaced signal contains two fields of a video frame captured at two different times, enhancing motion perception by the viewer and reducing flicker.

"Jitter" in this context refers to the deviation from true periodicity of a presumed periodic signal in electronics and telecommunications, often in relation to a reference clock source.

"LAN" in this context refers to logic implementing a network that interconnects computers and devices in a defined area such as a home, school, computer laboratory, or office building. LANs, in contrast to wide area networks (WANs), include usually higher data-transfer rates, smaller geographic area, and lack of a need for leased telecommunication lines. Ethernet over twisted pair cabling, and Wi-Fi (Wireless LANs, or WLANs) are two common technologies currently used to build LANs.

"Miracast" in this context refers to a peer-to-peer wireless screencasting standard for streaming video and graphic content wirelessly between devices using Wi-Fi. It is a point-to-point, enhanced version of WiFi Direct that allows both audio and video content transfer between two devices without the need to be near a WiFi Access Point, the use of a router, or integration within full home or office network.

"MOS" in this context refers to Mean Opinion Score. The Mean Opinion Score is a numerical measure of the quality of human speech at the destination end of the circuit.

"OSI physical layer" in this context refers to one of the seven layers of the Open Systems Interconnect (OSI) model. The physical layer is the lowest layer of the OSI model and is concerned with the transmission and reception of the unstructured raw bit stream over a physical medium. It describes the electrical/optical, mechanical, and functional interfaces to the physical medium, and carries the signals for all of the higher layers.

"Pop" in this context refers to a gap in an audio stream generally caused by issues with timely filling and emptying of audio buffers by a computer system.

"Refresh rate" in this context refers to frequency (Hz) which translates into the number of times per second a monitor redraws the entire screen.

"Smart device" in this context refers to an electronic device generally connected to other devices or networks via different protocols such as Bluetooth, NFC, WiFi, 3G and the like that can operate to some extent interactively and autonomously. Exemplary smart devices include, but are not limited to, smartphones, tablets, personal digital assistants, smartwatches, smart bands and smart keychains.

"Telecine" in this context refers to the process of converting cinematographic film to videotape and/or a television signal.

"VoIP" in this context refers to Voice over Internet Protocol or IP telephony, a technology for transmitting voice, such as ordinary telephone calls, over packet-switched data networks, such as the Internet. Voice over Internet Protocol is a technology which allows the transmission of voice over data networks. This makes normal phone calls over such networks possible.

"Wavelet transform" in this context refers to one of the methods of time-frequency-transformations. It decomposes signals into different frequency ranges and allows extraction of features relating to quality.

"Wi-Fi direct" in this context refers to a peer-to-peer specification that allows devices certified for Wi-Fi Direct to exchange data without an Internet connection or a wireless router.

"Wireless" in this context refers to the transmission and/or reception of signals "without wires", i.e. communication without any wireline connections between the sender and the receiver. Wireless communications involves using the radio frequency spectrum (airwaves) and electromagnetic signaling logic to transmit information.

Description

Consumers increasingly consume multimedia content through a variety of client devices such as tablets, mobile phones, set top boxes, monitors, display screens and the like. They desire a near-flawless, rich, multimedia experience with and across different client devices and networks demanding a high level of audio and video quality and synchronization between the two.

Degradation of audio/video (A/V) playback quality can occur at many points along the way from source to viewer. For example, encoding, decoding, and transmission, each of which may occur multiple times before the end video is displayed, are all susceptible to degradation or corruption. Described herein is a system for audio/video display capture and analysis that reliably, repeatedly and consistently quantifies performance metrics and end user experience metrics through direct and/or indirect input of audio/video content. In some embodiments, the system is input agnostic, allowing for testing of various components of a video/audio playback system independent of a variety of methods by which the various components receive, transmit and/or display data. The system can further introduce testing into each aspect of the video transmission, allowing for isolation of the source of errors such as smoothness, frame jitter, frame judder, glitches, dropouts, distortions, data errors, pop, clipping, slow display response times, frame rate reduction, and the like.

Audio/video displays may be tested using the system described herein with controlled, arbitrary or streaming video content. Controlled video content is created by making a tagged test video. Arbitrary video content uses only the reference source video, eliminating the need for creating special media with tagged video content. Streaming video is content sent in compressed form over the Internet and displayed by the viewer in real time. The video content is transmitted wirelessly to a display. In some embodiments, the video playback on the display is then sent through an air medium to the lens of a display capture device. The display capture device records the playback at a rate higher than the normal frame transmission (generally between about 24 to about 60 fps) and human discernment (about 100 fps) and sends the information from the display capture device to an A/V analysis server. In other embodiments, the video content is transmitted wirelessly to a set top box or other information appliance device and the playback information is captured on a capture card and then sent to or read by an A/V analysis server where audio/video playback metrics and end user experience metrics are measured. In a further embodiment, the video content is transmitted via video conferencing software to a remote device which then transmits playback information to an A/V analysis server.

Video starts as recorded or animated frames with or without audio. Test videos for controlled video content used in the analysis of client device display quality are created by using software to add tags to each frame in a video. The tags allow individual frames to be extracted and analyzed at the device output or via a display capture device such as a high speed camera. Frames can be tagged by any means generally used including visible and invisible tagging. Exemplary tags include, but are not limited to, barcodes, time stamps, audio queues, frame-parallel analog/digital signals or other means generally used by one of skill in the art. In some embodiments, the tag is such that change to any single part of the tag will result in an error code so that accuracy can be ensured. For example, in some instances the barcode may contain an Error Correction Code (ECC) so that if part of the code is removed due to a transmission glitch, the barcode will produce an error when scanned. In other embodiments, each frame is numbered. In some embodiments, the frames are numbered and tagged.

In other embodiments, arbitrary video content is used. Arbitrary video content does not contain tagged frames, but access to the playback reference is available. The reference content is compared to the test playback frame by frame to synchronize major transitions in the video. The synchronization points are then used to interpolate which frames in the reference are compared to the test playback. Once synchronized, the arbitrary video content can be analyzed using the same methods used for analyzing tagged video content.

In some embodiments, tags may be super imposed on top of the video content allowing for live tagging. For example, in testing video game content streaming, a barcode may be pasted on each frame in real time allowing for unlimited types of content to be tested. In some embodiments. as the scene is rendered, the tag is drawn on the side. In other embodiments, the tag may be inserted before the scene hits the graphic card and rends.

In addition to visual barcoding, in some embodiments, each frame may be tagged with a multi-frequency audio barcode with a plurality of tones. Such tones may additionally be varied in intensity or amplitude for example: off, on, or varying degrees of off or on (such as ¼, ⅓, ½, ¾ etc.) allowing for an increased amount of information to be included in each audio code. In some embodiments, the audio tone may be separated across various channels such as the left and right channel in stereo allowing for increased variability in the audio barcode. At least two, three, four, five, six, seven, eight, nine, ten, eleven, twelve, thirteen, fourteen, fifteen or more tones, intensities and/or channels may be used to create audio barcodes. In some examples at least of seven tones with three different states may be used providing 2187 ($3^7$) possible combinations for each component of an audio barcode though different amounts of tones and states may also be used. In additional examples at least eight tones with six different states and two channels may be used providing 16777216 ($16^6$) possible combinations for each component of an audio barcode. Additional combinations of tones and states may be used in accordance with these formula. The greater the possible combinations, the more audio barcodes can be created before it becomes necessary to repeat the sequence allowing for greater accuracy in pinpointing playback errors. For example, with 2187 possible combinations testing video that is 30p per second, the audio barcodes would need to repeat every 72.9 seconds. With 16777216 possible combinations and video displaying at a rate of 30p per second, the audio barcodes would only need to repeat every 9320.67 minutes. In additional embodiments, blocks of frames may be assigned to a particular audio tone. For example, video frames 0-29 may match audio tone 0, video frames 30-59 may match audio tone 1 and the like. Such blocking may be repeated at smaller increments, allowing for successive narrowing of synchronization errors to a particular frame or series of frames allowing for reduction in aliasing issues and compensating for different quality and compression algorithms in different types of audio/video playback.

Algorithms may be used to match the audio and video barcodes to ensure that they are syncing correctly. In some embodiments, video barcodes may loop three times for every audio barcode creating an oversampling of the images in relation to the sound (e.g., $3^7$ vs $3^8$ or $16^6$ vs $16^7$). The audio barcode may be analyzed using any analysis that is able to represent a signal in the time and frequency domain at the same time. Such analysis may be used alone or in combination with algorithms that analyze additional functions such as windowing and processing the data. For example, wavelet analysis may be used to separate the frequencies of the audio barcode at specific time points while fast Fourier transform (FFT) keeps windowing and processing the data. These audio barcodes may be used to pinpoint audio dropouts, pops, clipping and syncronization errors in playbacks. Snippets of the playback containing detected anomalies may be saved for later analysis. The time stamped error and details of the error are tied to the device logs allowing developers to isolate areas in need of correction.

The display of the client device can receive the video content through Wi-Fi, Miracast, through video conferencing software or similar wireless protocols. In some embodiments, the video content may be sent wirelessly to a set top box or other information appliance device (client device). In other embodiments, the video content may be sent through multiple wireless channels, for example through Wi-Fi to a smart device and from the smart device through Miracast to a second display. In a further embodiment, video may be sent via video conferencing software to a display device.

Frame rate describes both the speed of recording and the speed of playback. Frames per second is a measure of frame rate, i.e., the number of still images that make up one second's worth of video or animation. The more frames or images recorded per second, the more accurately motion is documented onto the recording medium. Frame rates are most often expressed in frames per second (FPS) or in progressive scan monitors as hertz (Hz (cycles per second)). There are three main frame rate standards, 24p fps, 25p fps, and 30p fps, however, as technology progresses, other frame rates have come into use. Common progressive formats include, but are not limited to, 24p (23.98p) fps, 25p fps, 30p (29.97p) fps, 48p fps, 50/60p fps, 72p fps, 90p/100p fps, 120p fps among others. Exemplary interlaced formats include, but are not limited to, 50i fps, and 60i (59.94i) fps.

Video content is generally transmitted at the rate of 24 frames per second (fps) with the National Television System Committee recommending 29.97 interlaced fps. High definition broadcast video is transmitted at a rate of 59.94 fps in North America and 50 fps in Europe. Human persistence of vision creates the illusion of smooth moving video when the number of frames displayed exceeds about 20 frames per second. The display capture device used in an embodiment of the system for audio/video display capture and analysis oversamples the video, capturing frames at a rate higher than the transmission rate and the rate of human persistence of vision, for example, a rate of at least 240 frames per second, 300 frames per second, 338 frames per second, 400 frames per second, 500 frames per second, or more. This oversampling allows for identification of errors that a human observer would miss but which contribute to the overall perception of the quality of the playback. For example, an audio mismatch of 40 milliseconds is difficult for a human observer to pinpoint, but is enough of difference to be a distraction affecting the perceived quality of the playback. In some embodiments, the display capture device captures the video at a rate at least two times the refresh rate of the display being tested and/or the frame rate of the content.

Exemplary display capture devices include, but are not limited to, a high speed camera or other optical sensor such as photodiodes. In some embodiments, the display capture device is calibrated prior to use. For example, a high speed video camera may be analyzed using a resistor-capacitor (RC) oscillator to verify the camera's frame rate to light ratio. In further embodiments, camera quality may be analyzed using barcodes in a video. The accuracy of a camera's capture of video barcodes may be used to calibrate a camera for barrel distortion, pincushion distortion, mustache distortion, radial distortion, perspective distortion, curvilinear distortion, chromatic aberration, vignetting and the like. Such analysis may be performed when the camera itself is the device under test, or to calibrate the camera prior to using it to test a separate device under test.

In some embodiments, a plurality of display capture devices may be used. Each of the plurality of display capture devices may perform the same or different functions and may capture images at the same or different speeds. For example, in some embodiments, a first high speed camera will capture images for temporal analysis. A second high speed camera will capture images at a higher resolution though a slower frame rate than the first high speed camera. The information from the second camera will be synchronized with the refresh rate of the device being tested using the temporal information from the first camera. In other embodiments, content is sent to a set top box or other information appliance device which is connected via a cable to an HDMI capture card or other type of capture card. In additional embodiments, the set top box or other information appliance device is connected via cable to an audio/video analysis server. In some embodiments, information sent through the set top box or other information appliance device connected via a cable may be synchronized with the video signal so the capture rate may be the same as the frame rate.

Extracting images using a display capture device allows for the same analysis to be performed regardless of the initial source of the content, i.e. agnostic transmission. Following capture, the frames from the display capture device are processed by the A/V analysis server. Extracting frames from the playback allows the data from the display capture device to be analyzed as though it were an input signal received for quality analysis. In some embodiments, the system described herein may use both display capture devices and direct cable connections to capture information from one or more client devices. The captured information is then sent to an A/V analysis server for processing. The A/V analysis server may analyze the frames for one or more audio/visual performance metrics that impact end user experience including, but not limited to amounts of, telecine/pull down synchronization, frame jitter, frame judder, frame skip, frame tear, macro level quality comparison to the original, pixel to pixel quality comparison to the original, audio synchronization, and comparison to MOS scoring. For example, video displays and some communication links are locked to specific operating frame rates or frequencies, e.g. many broadcast television signals are at around 30 Hz. However, content may exist natively in a different frame rate, such as 24 frames per second. During telecine processing, most systems vary the pulldown so that the content can match the playback frequency. For example, during 2:3 pulldown, odd frames are displayed for two refresh intervals and even frames are displayed for three refresh intervals. Statistical analysis of the number of times each frame is delayed may be used to determine what, if any, pulldown strategies are employed and any errors that occur in the conversion of movie content to video or television. Such errors include frame judder, a shaking or wobbling effect in a video image caused when the content frame rate cannot be evenly placed into the refresh rate of the broadcast or display device; frame jitter, a quantification of how many frames deviate from the expected pulldown (i.e. frames that are displayed for either too many or too few refresh intervals); frame skip, identification of frames that are not detected during playback; and frame tears, full output frames that contain contents from two or more input frames.

Video output typically contains some amount of zero-mean Gaussian noise, small random differences from frame to frame in pixel values that are not due to motion of an image element depicted by the pixel. Compression algorithms can either remove film grain to reduce file size of the final video or retain the original film grain at the cost of higher file size. Other decoding algorithms can also add film grain back during decoding using video algorithms. The resulting output can be analyzed using pixel-to-pixel analysis to determine how close the output matches the original. Pixel-to-pixel quality is determined by comparing output values directly against the reference or original video. Comparisons can be compensated by detecting the manipulation of the source signal the device performs on the content to adjust for color temperature, brightness, gamma correction and the like. Where input is tested via a high speed camera as described herein, video processing can be performed to compensate for reduced camera resolution vs. screen resolution, optical aberrations, parallax, chromatic aberrations and sensor noise.

In some embodiments, audio synchronization and analysis may be performed in parallel with the video analysis. Audio can be captured using the analog or digital audio output in parallel with the video input or via a microphone during output. Audio waveforms from the reference media may be compared to the audio waveforms from the playback to ensure accurate audio reproduction. Additionally, the audio can be analyzed to determine if it is in synchronization with the video or if the audio/video processing stages and/or system configuration causes the audio to arrive early or late in relation to the video.

Audio/video playback is analyzed not only by frame, but also as a sequence of events with each second or fraction of a second identified and analyzed. The system can further introduce testing into each aspect of the video transmission, allowing for isolation of the source, the circumstances, and location in the playback system where they occur. For example, errors may occur when the system is running scheduled background processes. Other times errors may occur when no background processes are running. In further embodiments, errors may occur when a client device is receiving information or decoding for playback. During product development or repair, it is desirable to know when and where errors occur, allowing identification of possible causes of the errors in the client device and/or transmission system and encoding/decoding process.

The source agnostic analysis system described herein may additionally be used to analyze transmissions including real-time transmissions sent through the cloud, such as through Skype, Google Hangouts, Facetime or other video conferencing programs. An audio and visual pattern generator plays a sequence of audio tones and light emissions that are received by a webcam, sent to a first device connected via video conference to be received and displayed by a second device. In some embodiments the first device is the device under test. In other embodiments the second device is the device under test. In further embodiments, both devices may be under test. In additional embodiments, both of the devices may have a known profile and the webcam is under test. In yet another embodiment, the webcam and the first and second devices may have a known profile but the video conferencing software or a WiFi connection is under test. The first device or the second device or both may be connected to an analyzer server which collects playback metrics and end user experience metrics on the transmitted and received data. Such metrics may include, but are not limited to, the average frame rate of the videoconferencing session, the total number of freeze frames/stutters. total number of audio and/or video dropouts, the total duration of audio and video dropouts, any audio/video synchronization issues and the like, all of which impact the end user experience.

In some embodiments, the audio and visual pattern generator may display light emissions in pairs and each audio tone may coordinate with the blinking light emission patterns. For example, an audio and visual pattern generator with four lights and four tones would yield $2^4$ pattern combinations that could be transmitted. A comparison of the video taken and the video received allows for real time analysis of the webcam, transmitting device, cloud service provider, and receiving device alone or in any combination thereof. In some embodiments, an analyzer server may be connected to both the transmitting and receiving devices allowing for comparative analysis and/or testing of multiple client devices at once.

In some embodiments, human perception of playback may be determined analytically. For example, videos may be created with various levels of quality as scored by the audio/visual playback metrics and end user experience metrics described herein. Focus groups may view these videos and score them using mean opinion scoring to provide a subjective rating. The objective rating scored by the audio/visual playback metrics and end user experience metrics described herein may be statistically mapped to the subjective scores allowing for the generation of a subjective type score without actually needing a human viewer to actively rate playback performance and the creation of stable correlations with subjective human perception.

Drawings

Referring to FIG. 1, in one embodiment, video content server 102 sends a video signal 128 via Ethernet to a local area network (LAN 104). The LAN 104 sends the video signal via Wi-Fi 122 to a tablet 106 or other client device which plays the video content. The video content displayed on the tablet 106 is then captured by a high speed video camera 108. The resulting capture is then sent for analysis to the A/V analysis server 120. In another embodiment, video content server 102 sends a video signal 128 via Ethernet to LAN 104. The LAN 104 sends the video signal 128 via Wi-Fi 122 to a set top box 110. The set top box 110 sends the video signal 128 through an HDMI or similar cable 124 to an HDMI capture card 112 which transmits the video to the A/V analysis server 120. In a further embodiment, the video content server 102 sends a video signal 128 via Ethernet to a LAN 104. The LAN 104 sends the video via Wi-Fi 122 to a smartphone 114. The smartphone 114 then sends the video using Miracast 126 or a similar protocol to a display 116. The video playback on the display 116 is then captured via a high speed camera 118. The resulting capture is then sent for analysis to the A/V analysis server 120.

Figure 2:
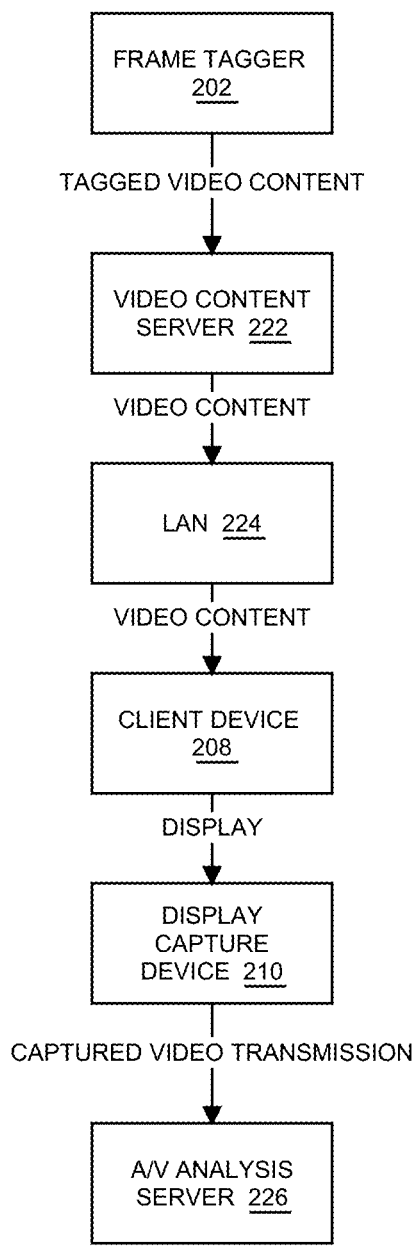
FIG. 2 is a system diagram of an embodiment of a system for video playback analysis.
Figure 3:
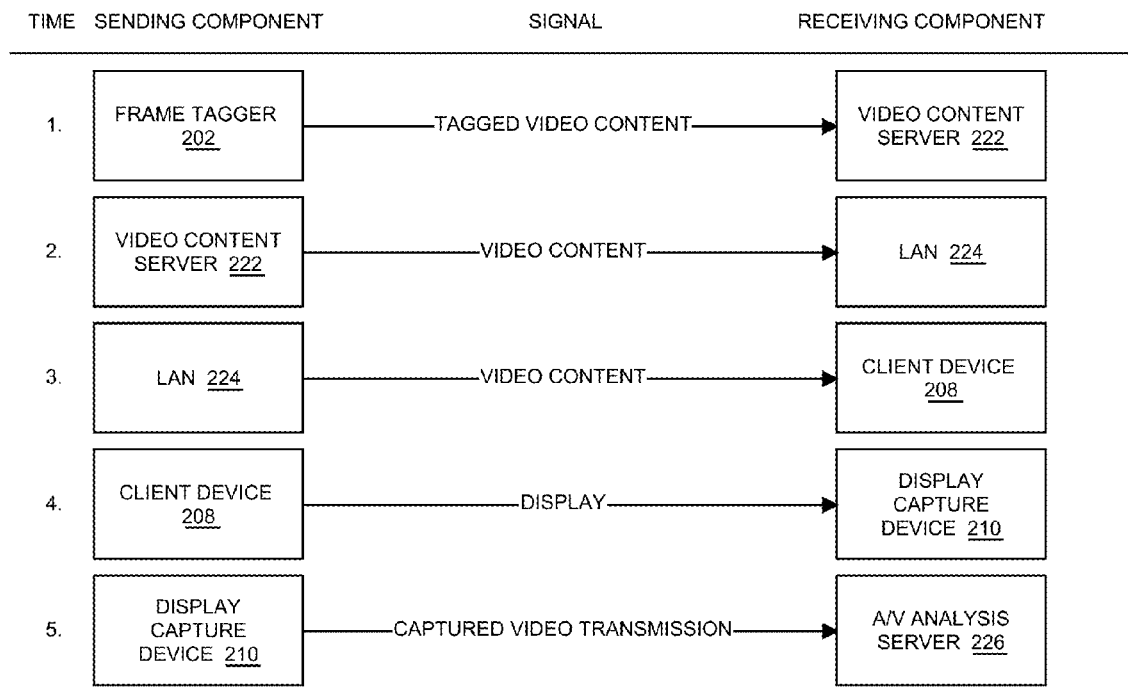
FIG. 3 is an action flow diagram of an embodiment of a system for video playback analysis.
Figure 4:
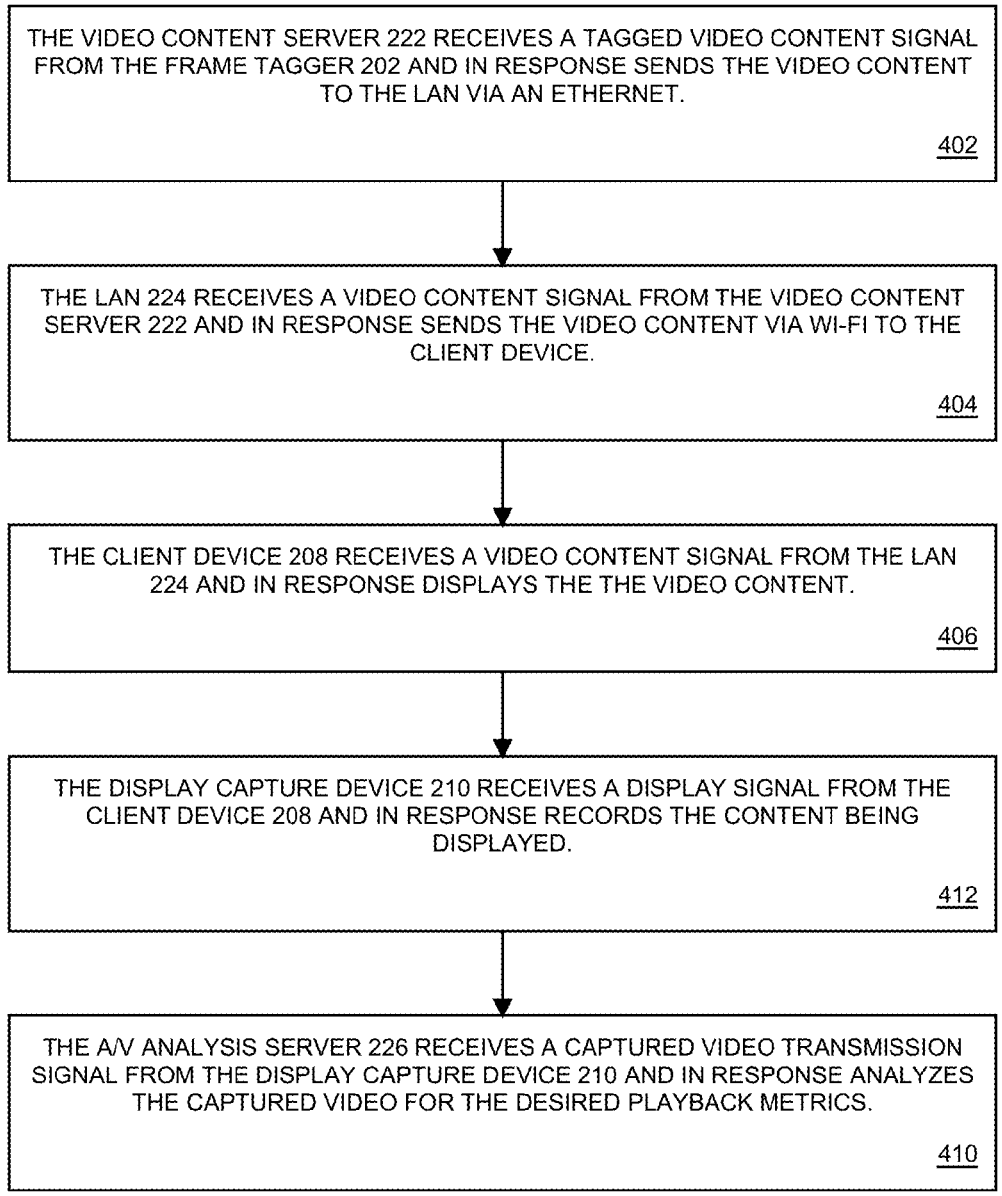
FIG. 4 is a flow chart of an embodiment of a process for video playback analysis.

FIG. 2 is a system diagram of an embodiment of a system for video playback analysis. FIG. 3 is an action flow diagram of an embodiment of a system for video playback analysis. FIG. 4 is a flow chart of an embodiment of a process for video playback analysis.

The system comprises frame tagger 202, video content server 102, LAN 104, client device 208, display capture device 210, and A/V analysis server 120. The video content server 102 receives a tagged video content signal from the frame tagger 202 and in response sends the video content to the LAN via an ethernet (402). The LAN 104 receives a video content signal from the video content server 102 and in response Sends the video content via Wi-Fi to the client device (404). The client device 208 receives a video content signal from the LAN 104 and in response Displays the video content (406). The display capture device 210 receives a display signal from the client device 208 and in response Records the content being displayed (412). The A/V analysis server 120 receives a captured video transmission signal from the display capture device 210 and in response analyzes the captured video for the desired playback metrics (410).

Figure 5:
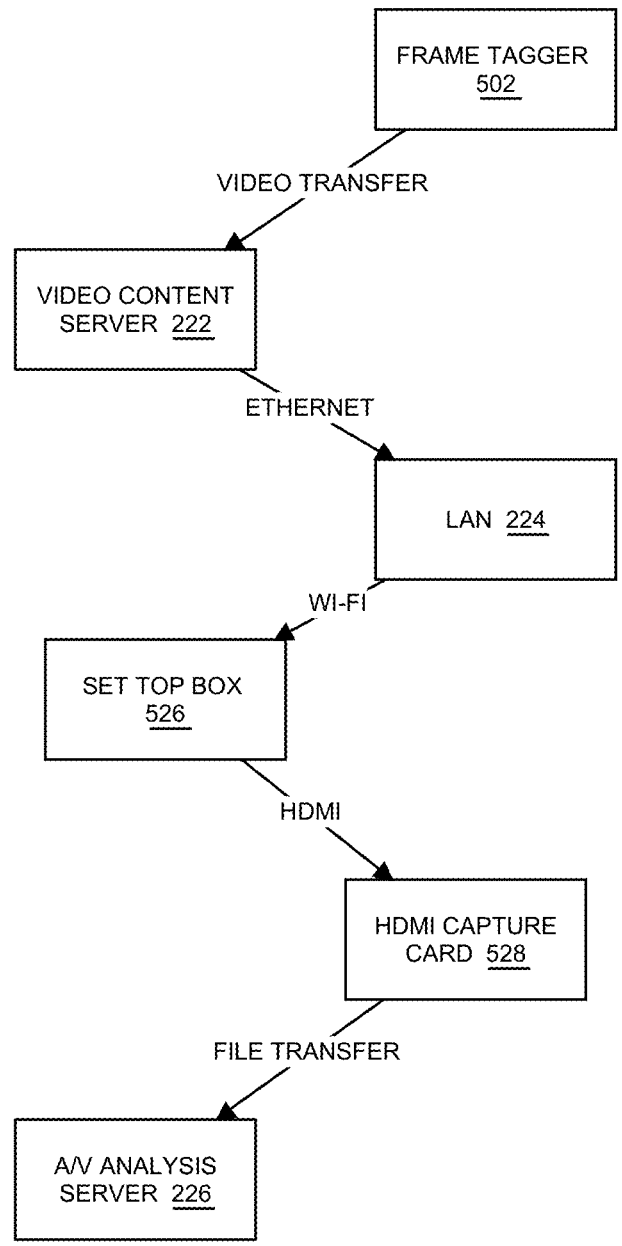
FIG. 5 is a system diagram of an embodiment of a system for audio/video analysis.
Figure 6:
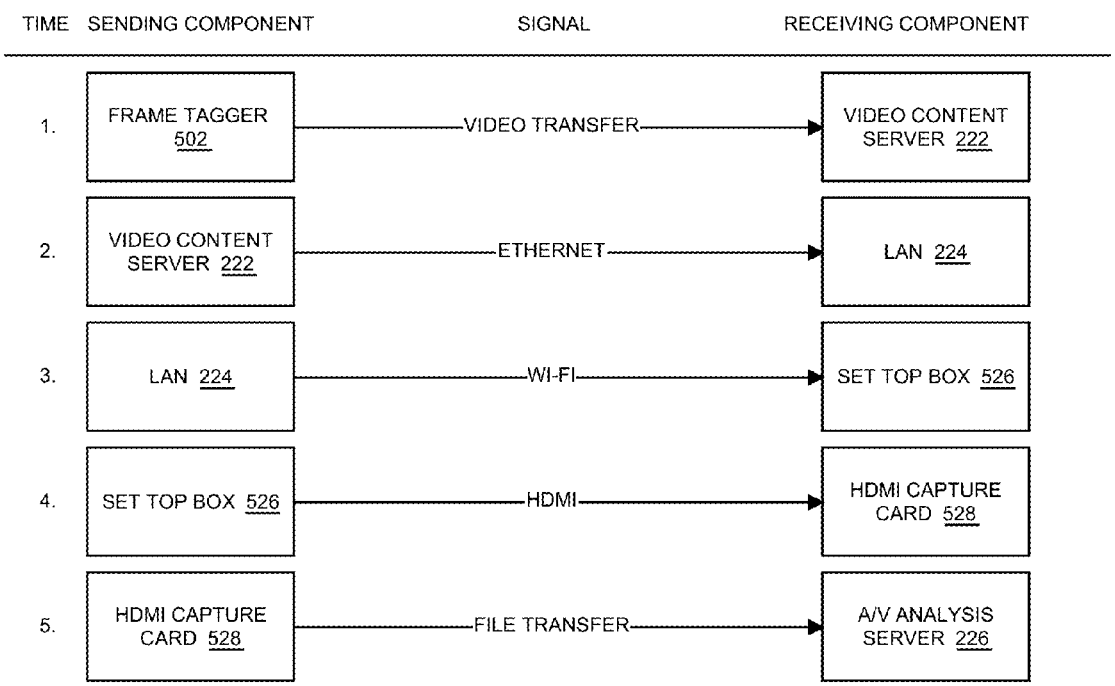
FIG. 6 is an action flow diagram of an embodiment of a system for analyzing audio/video playback.
Figure 7:
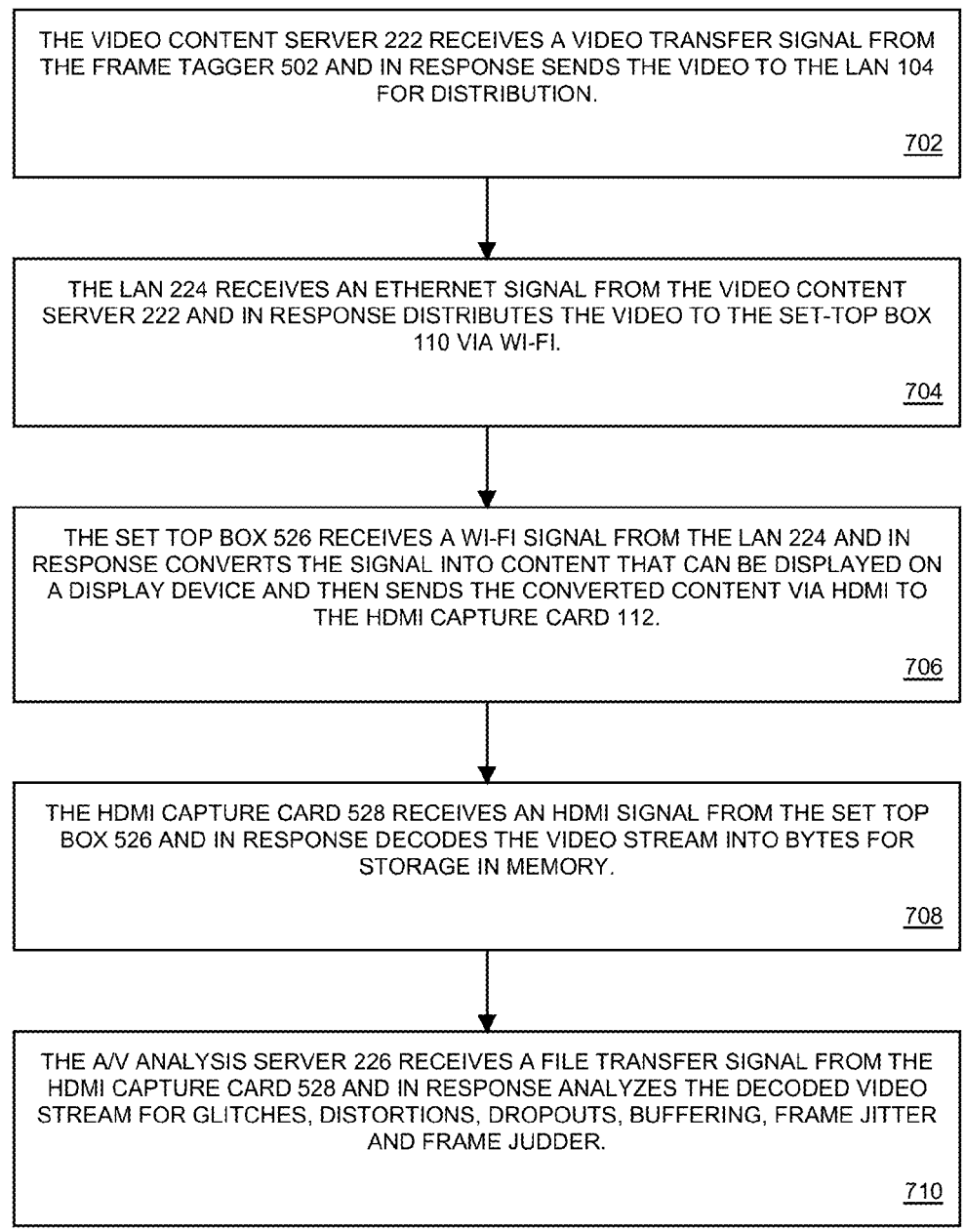
FIG. 7 is a flow chart of an embodiment of an audio/video playback analysis system.

FIG. 5 is a system diagram of an embodiment of a system for audio/video analysis. FIG. 6 is an action flow diagram of an embodiment of a system for analyzing audio/video playback. FIG. 7 is a flow chart of an embodiment of an audio/video playback analysis system.

The system comprises frame tagger 502, video content server 102, LAN 104, set top box 110, HDMI capture card 112, and A/V analysis server 120. The video content server 102 receives a video transfer signal from the frame tagger 502 and in response sends the video to the LAN 104 for distribution (702). The LAN 104 receives an Ethernet signal from the video content server 102 and in response distributes the video to the Set-Top Box 110 via Wi-Fi (704). The set top box 110 receives a Wi-Fi signal from the LAN 104 and in response converts the signal into content that can be displayed on a display device and then sends the converted content via HDMI to the HDMI capture card 112 (706). The HDMI capture card 112 receives a HDMI signal from the set top box 110 and in response decodes the video stream into bytes for storage in memory (708). The A/V analysis server 120 receives a file transfer signal from the HDMI capture card 112 and in response Analyzes the decoded video stream for glitches, distortions, dropouts, buffering, frame jitter and frame judder (710).

Figure 8:
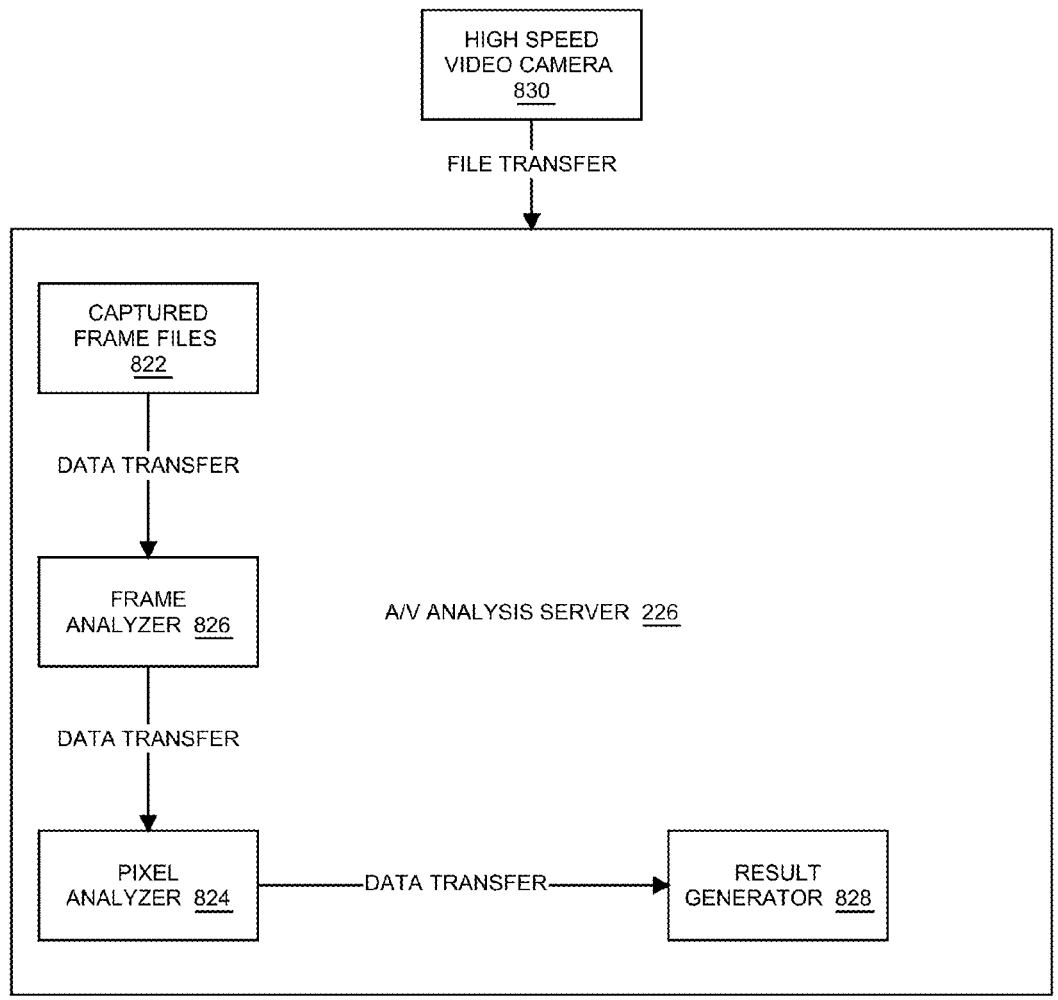
FIG. 8 is a system diagram of an embodiment of an audio/video analysis system.
Figure 9:
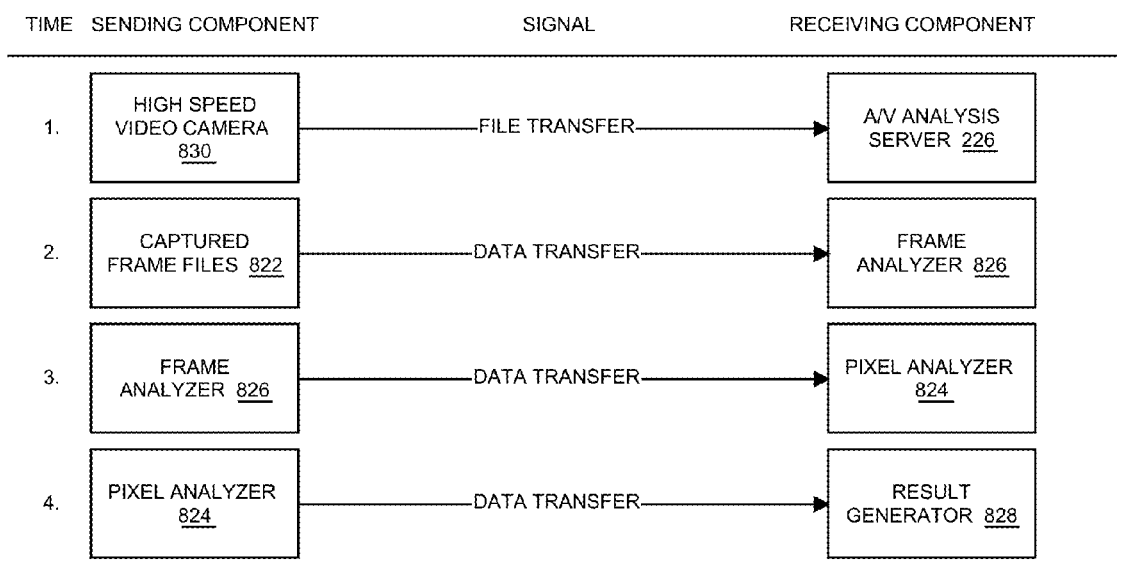
FIG. 9 is an action flow diagram of an embodiment of a process for audio/video analysis.

FIG. 8 is a system diagram of an embodiment of an audio/video analysis system. FIG. 9 is an action flow diagram of an embodiment of a process for audio/video analysis. FIG. 10 is a flow chart of an embodiment of a process for audio/video analysis.

The system comprises A/V analysis server 120, captured frame files 822, high speed video camera 108, pixel analyzer 824, frame analyzer 826, and result generator 828. The A/V analysis server 120 receives a file transfer signal from the high speed video camera 108 and in response generates a file including video information and values as a captured frame file (1002). The frame analyzer 826 receives a data transfer signal from the captured frame files 822 and in response analyzes the playback performance for timing of frame delivery, skipped frames, glitches, frame jitter, frame judder, frame skips and frame tears (1004). The pixel analyzer 824 receives a data transfer signal from the frame analyzer 826 and in response performs a pixel-to-pixel quality comparison to the original (1006). The result generator 828 receives a data transfer signal from the pixel analyzer 824 and in response generates a report of the playback performance by second and a summary of correct display rates at refresh intervals (1008).

Figure 11:
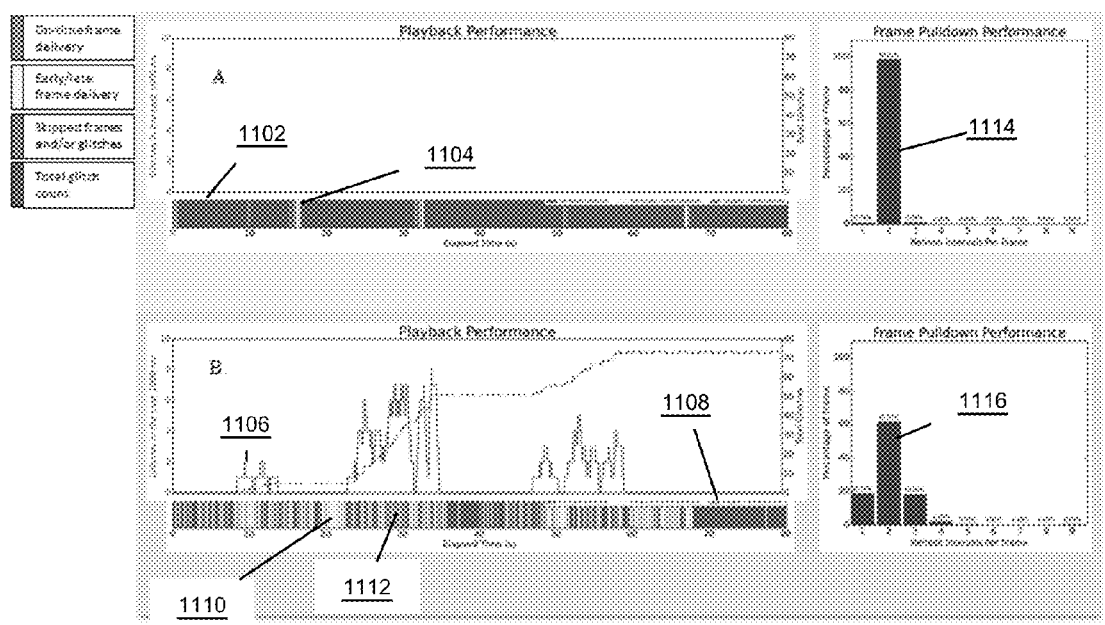
FIG. 11 is a graph depicting (A) optimized and (B) error laden playback performance as determined by an embodiment of the system described herein with a video playback of 30 frames per second (fps) on a 60 hertz (hz) display.

FIG. 11 is a graph depicting (A) optimized and (B) error laden playback performance as determined by an embodiment of the system described herein with a video playback of 30 frames per second (fps) on a 60 hertz (hz) display. Playback performance in FIG. 11A is a near ideal playback performance with nearly all of the frames arriving on time and displayed for the proper length of time as seen at 1102. Periodic early/late frames as shown at 1104 occur occur when the operating system is running scheduled background process. The correct display rate occurred 98.22% of the time as shown at 1114. In comparison as shown in FIG. 11B, when more processes ran in the background there was a higher error rate with a correct display rate occurring only 61.53% of the time.

Figure 12:
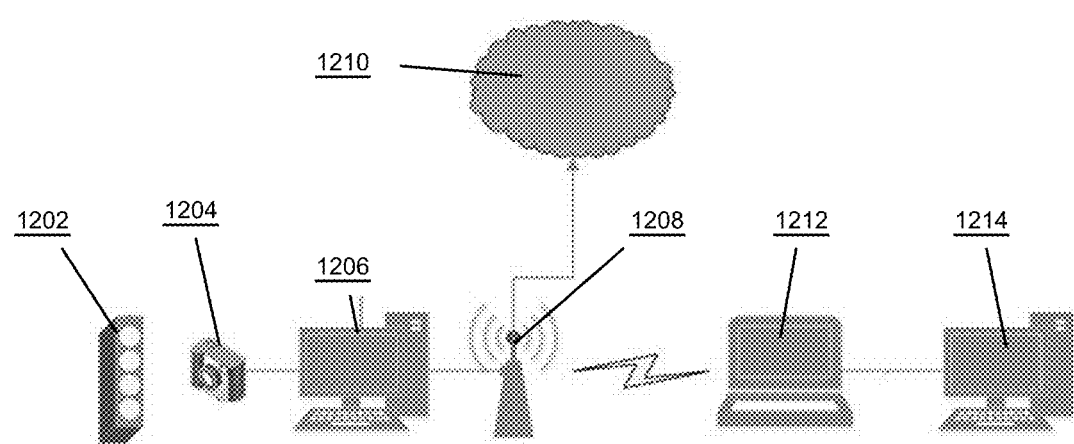
FIG. 12 is a depiction of a means of analyzing the quality of a video and VoIP transmission.

Referring to FIG. 12, a webcam 1204 is pointed at an electronic device 1202 that generates an audio and visual pattern. The webcam 1204 streams audiovisual content over the VoIP and video session 1210. The webcam 1204 streaming audio and video content is connected to a reference PC 1206 that is connected via a local area network (LAN) to the device under test 1212 over a VoIP and video session 1210. The output of the device under test 1212 is connected to an Analysis PC 1214 via a display port to HDMI converter. The webcam 1204 captures the audio and visual pattern generated by the audio and visual pattern generator. The capture audio and visual pattern is then transmitted by the webcam 1204 to the reference PC 1206. The reference PC 1206 then sends a signal to a WiFi access point 1208. The signal is transmitted through the cloud 1210 and displayed using the device under test 1212. The performance of the device under test 1212 is then analyzed using the analyzer server 1214.

Figure 13:
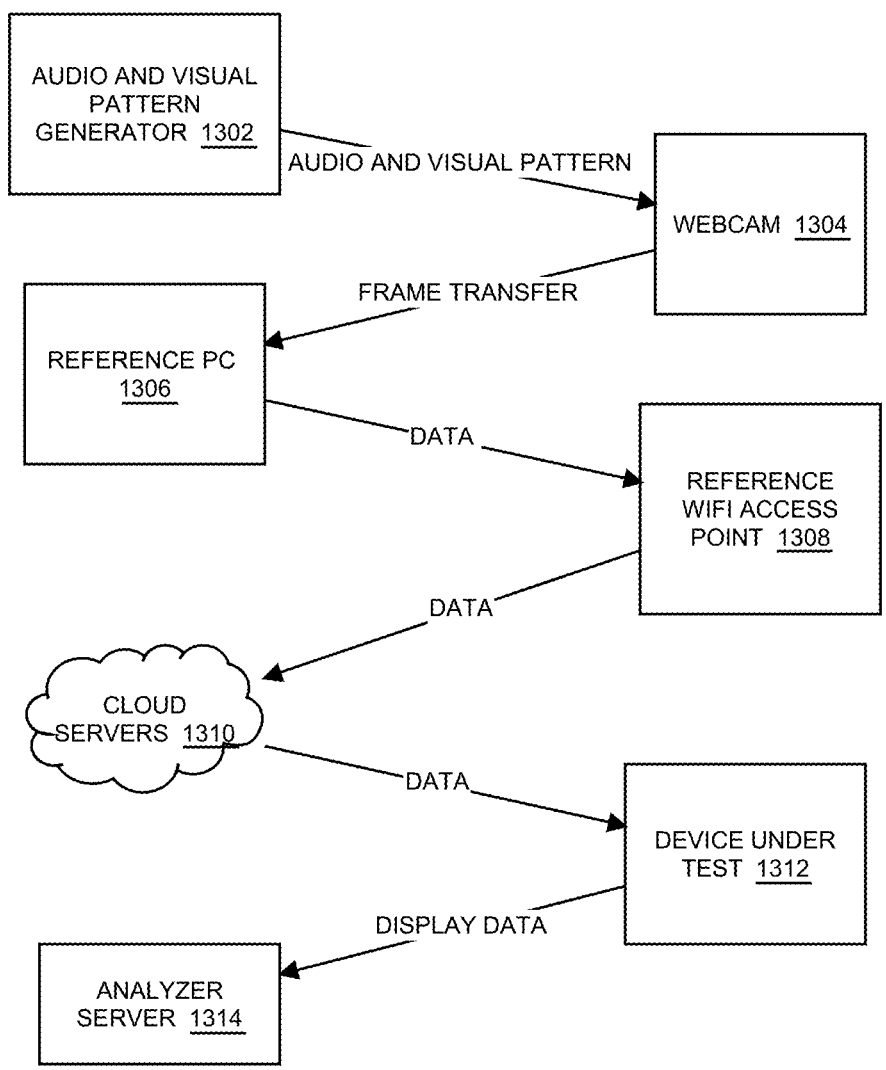
FIG. 13 is a system diagram of a means for testing the accuracy of a display in displaying information received via VoIP and video streaming.
Figure 14:
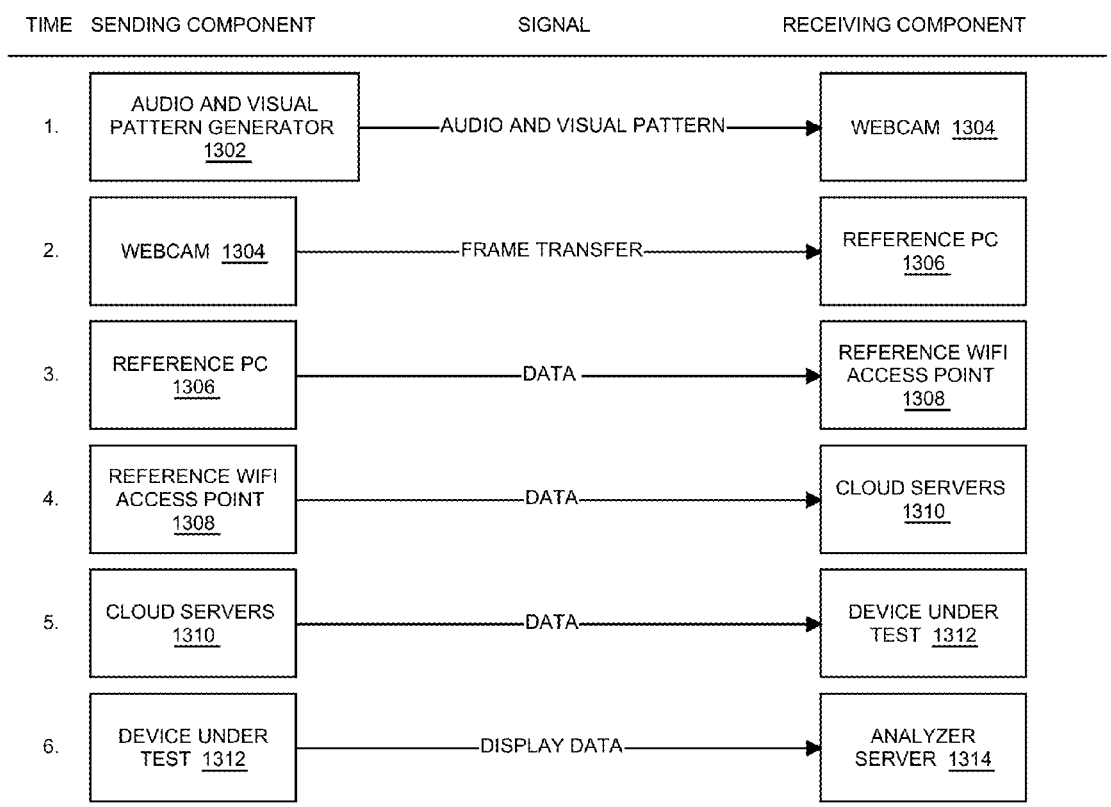
FIG. 14 is an action flow diagram of a system for testing the accuracy of a display in displaying information received via VoIP and video streaming.
Figure 15:
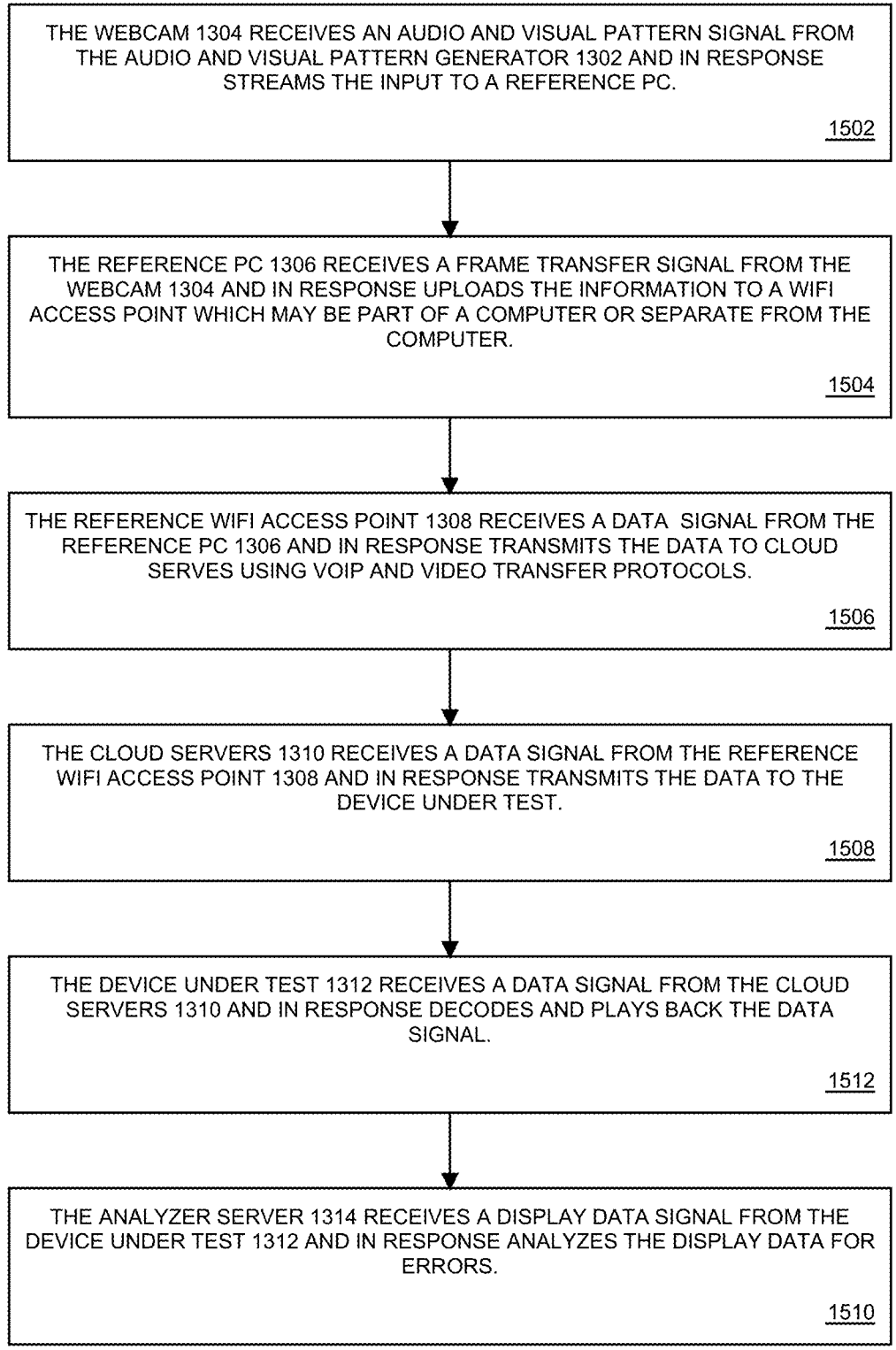
FIG. 15 is a flow chart of an embodiment of a means for testing the accuracy of a display in displaying information received via VoIP and video streaming.

FIG. 13 is a system diagram of a means for testing the accuracy of a display in displaying information received via VoIP and video streaming. FIG. 14 is an action flow diagram of a system for testing the accuracy of a display in displaying information received via VoIP and video streaming. FIG. 15 is a flow chart of an embodiment of a means for testing the accuracy of a display in displaying information received via VoIP and video streaming.

The system comprises Audio and Visual Pattern Generator 1302, Webcam 1304, Reference PC 1306, Reference WiFi access point 1308, cloud servers 1310, Device under test 1312, and Analyzer server 1314. The Webcam 1304 receives an Audio and Visual Pattern signal from the Audio and Visual Pattern Generator 1302 and in response streams the input to a reference PC (1502). The Reference PC 1306 receives a frame transfer signal from the Webcam 1304 and in response uploads the information to a WiFi access point which may be part of a computer or separate from the computer (1504). The Reference WiFi access point 1308 receives a data signal from the Reference PC 1306 and in response transmits the data to cloud serves using VoIP and video transfer protocols (1506). The cloud servers 1310 receives a data signal from the Reference WiFi access point 1308 and in response transmits the data to the device under test (1508). The Device under test 1312 receives a data signal from the cloud servers 1310 and in response decodes and plays back the data signal (1512). The Analyzer server 1314 receives a display data signal from the Device under test 1312 and in response analyzes the display data for errors (1510).

It will be readily understood that the components of the system as generally described and illustrated in the figures herein could be arranged and designed in a wide variety of different configurations. Elements of embodiments described above may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of a source agnostic video testing system have been described. The following claims are directed to said embodiments, but do not preempt audio/video testing in the abstract. Those having skill in the art will recognize numerous other approaches to audio/video testing are possible and/or utilized commercially, precluding any possibility of preemption in the abstract. However, the claimed system improves, in one or more specific ways, the operation of a machine system for source agnostic video testing, and thus distinguishes from other approaches to the same problem/process in how its physical arrangement of a machine system determines the system's operation and ultimate effects on the material environment.

What is claimed is:

1. A source agnostic audio/video analysis system for testing image playback display comprising:
   a video content server;
   a client device capable of receiving wireless video transmission;
   a first display capture device;
   an audio/video analysis server; and
   a second display capture device;
   wherein the first display capture device is adapted to capture video frames from the video content server displayed on the client device at a rate higher than a frame display rate on the client device;
   wherein the second display capture device captures video frames from the video content server displayed on the client device at a higher resolution and a slower frame rate than the first display capture device; and
   wherein the captured video frames are analyzed by the audio/video analysis server to locate and identify errors subject to aliasing at the client device frame display rate and map the errors to a time point in a video playback at which they occur.

2. The audio/video analysis system of claim 1, wherein the frame display rate on the client device is 23.98 progressive frames per second.

3. The audio/video analysis system of claim 1, wherein the rate higher than the frame display rate on the client device is at least 338 frames per second.

4. The audio/video analysis system of claim 1, wherein video displayed on the client device is sent through an air medium to a lens of the first display capture device.

5. The audio/video analysis system of claim 1, wherein the rate higher than the frame display rate is about two times a refresh rate of the client device.

6. The audio/video analysis system of claim 1, wherein each captured video frame is tagged.

7. The audio/video analysis system of claim 6, wherein each frame is tagged in real time.

8. The audio/video analysis system of claim 1, wherein audio of each frame is tagged.

9. The audio/video analysis system of claim 8, wherein a combination of at least seven tones is used to create the tag for the audio.

10. A method for analyzing audio/video playback comprising:
    oversampling an audio/video playback on a display using a first high speed camera to capture errors subject to aliasing at a rate of playback on the display;
    wherein frames captured by the first high speed camera are captured at about two times a refresh rate of the audio/video playback of the display;
    transferring the captured frames to a frame analyzer;
    analyzing frames captured by the first high speed camera with the frame analyzer, wherein the captured frames are compared to reference frames and analyzed according to end user experience metrics; and
    generating a report of playback errors using a result generator, wherein the playback errors are mapped to a time point at which they occur based on an analysis of images captured by the first high speed camera.

11. The method of claim 10, wherein the frames captured by the first high speed camera are captured at a rate of at least 338 frames per second.

12. The method of claim 10, wherein the audio/video playback is on a tablet.

13. The method of claim 10, wherein the audio/video playback is Miracast from a smartphone.

14. The method of claim 10, wherein the time point of the playback errors is identified.

15. The method of claim 10, wherein a second high speed camera captures the audio/video playback at a higher resolution and slower frame rate than the first high speed camera.

16. A source agnostic audio/video analysis system for testing image playback display comprising:
    a video content server;

a client device capable of receiving wireless video transmission;

a first display capture device; and an audio/video analysis server;

wherein the first display capture device is adapted to capture video frames from the video content server displayed on the client device at a rate higher than a frame display rate on the client device;

wherein the rate higher than the frame display rate is about two times a refresh rate of the client device; and wherein the captured video frames are analyzed by the audio/video analysis server to locate and identify errors subject to aliasing at the client device frame display rate and map the errors to a time point in a video playback at which they occur.

17. The audio/video analysis system of claim 16, wherein each frame is tagged.

* * * * *